US012296502B2

(12) United States Patent
Honoki et al.

(10) Patent No.: US 12,296,502 B2
(45) Date of Patent: May 13, 2025

(54) PEELING APPARATUS

(71) Applicant: DISCO CORPORATION, Tokyo (JP)

(72) Inventors: Koyo Honoki, Tokyo (JP); Ryohei Yamamoto, Tokyo (JP)

(73) Assignee: DISCO CORPORATION, Tokyo (JP)

( * ) Notice: Subject to any disclaimer, the term of this patent is extended or adjusted under 35 U.S.C. 154(b) by 215 days.

(21) Appl. No.: 17/805,724

(22) Filed: Jun. 7, 2022

(65) Prior Publication Data

US 2022/0410431 A1    Dec. 29, 2022

(30) Foreign Application Priority Data

Jun. 23, 2021   (JP) ................... 2021-104428

(51) Int. Cl.
| | |
|---|---|
| *B28D 5/00* | (2006.01) |
| *B08B 1/12* | (2024.01) |
| *B08B 1/32* | (2024.01) |
| *B23K 26/53* | (2014.01) |
| *B23K 103/00* | (2006.01) |

(52) U.S. Cl.
CPC .............. *B28D 5/0011* (2013.01); *B08B 1/12* (2024.01); *B08B 1/32* (2024.01); *B23K 26/53* (2015.10); *B28D 5/0052* (2013.01); *B23K 2103/56* (2018.08)

(58) Field of Classification Search
CPC .. B28D 5/0011; B28D 5/0052; B28D 5/0094; B28D 5/0076; B28D 5/047; B08B 1/12; B08B 1/32; B08B 1/20; B23K 26/53; B23K 26/0823; B23K 26/364; B23K 26/36; B23K 2101/40; H01L 21/02002; H01L 21/6704; H01L 21/7806; H01L 21/304; H01L 21/683; H01L 21/67046; H01L 21/78
See application file for complete search history.

(56) References Cited

U.S. PATENT DOCUMENTS

| | | | | |
|---|---|---|---|---|
| 6,152,813 A | * | 11/2000 | Suzuki | .............. B24B 53/017 |
| | | | | 451/443 |
| 2018/0085851 A1 | | 3/2018 | Hirata | |
| 2019/0006212 A1 | * | 1/2019 | Iizuka | ............. H01L 21/67721 |
| 2019/0287801 A1 | * | 9/2019 | Yamamoto | ........ H01L 21/67092 |
| 2019/0291239 A1 | * | 9/2019 | Yoshida | ............. B24B 27/0023 |
| 2019/0304800 A1 | * | 10/2019 | Yamamoto | ............ B28D 5/047 |

FOREIGN PATENT DOCUMENTS

| | | |
|---|---|---|
| JP | H09266185 A | 10/1997 |
| JP | 2000094221 A | 4/2000 |
| JP | 2016111143 A | 6/2016 |
| JP | 2018056347 A | 4/2018 |

OTHER PUBLICATIONS

Office Action issued by the Japanese Patent Office in corresponding Japanese Patent Application No. 2021-104428, mailed Mar. 14, 2025.

* cited by examiner

*Primary Examiner* — Galen H Hauth
*Assistant Examiner* — Baileigh Kate Darnell
(74) *Attorney, Agent, or Firm* — GREER BURNS & CRAIN, LTD.

(57) ABSTRACT

There is provided a peeling apparatus including an ingot holding unit that has a holding surface for holding an ingot, a wafer holding unit that is capable of approaching and separating from the ingot holding unit and has a holding surface for holding under suction a wafer to be produced, and a cleaning brush that cleans peel-off surfaces at which the wafer to be produced has been peeled off from the ingot and thereby removes peeling swarf.

6 Claims, 6 Drawing Sheets

PEELING APPARATUS

BACKGROUND OF THE INVENTION

Field of the Invention

The present invention relates to a peeling apparatus.

Description of the Related Art

As a method for manufacturing semiconductor wafers, a method of cutting out a wafer from a cylindrical ingot by a wire saw has hitherto been known. Cutting out a wafer from an ingot by a wire saw results in a great portion of the ingot being lost as a kerf loss (cutting margin), posing the problem of being uneconomical (see Japanese Patent Laid-open No. 2000-094221). In order to solve such a problem, there has been proposed a method of peeling off a wafer from an ingot by positioning, inside the ingot, a focused spot of a laser beam with a wavelength transmittable through the ingot and then forming a peel-off layer in a planned cutting plane (see Japanese Patent Laid-open No. 2016-111143).

SUMMARY OF THE INVENTION

However, the method of peeling off a wafer from an ingot with the peel-off layer serving as an interface involves the risk of contaminating the processing apparatus due to peeling swarf being produced from a peel-off surface and dropped at the time of transfer of the wafer.

Accordingly, it is an object of the present invention to provide a peeling apparatus that is capable of restraining contamination of an apparatus caused by peeling swarf produced at the time of peeling off a wafer from an ingot.

In accordance with an aspect of the present invention, there is provided a peeling apparatus for peeling off, from an ingot in which a peel-off layer is formed, a wafer to be produced, by positioning a focused spot of a laser beam with a wavelength transmittable through the ingot to a depth corresponding to a thickness of the wafer to be produced, from an end surface of the ingot, and applying the laser beam to the ingot. The peeling apparatus includes an ingot holding unit that has a holding surface for holding the ingot, a wafer holding unit that is capable of approaching and separating from the ingot holding unit and that has a holding surface for holding under suction the wafer to be produced, and a cleaning brush that cleans peel-off surfaces at which the wafer to be produced has been peeled off from the ingot and thereby removes peeling swarf.

The cleaning brush may be rotatable about an axis perpendicular to the holding surface of the wafer holding unit and the holding surface of the ingot holding unit. At least one of a peel-off surface of the wafer held by the wafer holding unit or a peel-off surface of the ingot held by the ingot holding unit may be cleaned by the cleaning brush being caused to come into contact with the one of the peel-off surfaces in a state in which the cleaning brush is rotated about the axis.

Further, the cleaning brush may include a first cleaning brush that faces the holding surface of the wafer holding unit and that cleans the peel-off surface of the wafer peeled off from the ingot and a second cleaning brush that faces the holding surface of the ingot holding unit and that cleans the peel-off surface of the ingot from which the wafer has been peeled off. The cleaning brush may be capable of simultaneously performing cleaning of the peel-off surface of the wafer by the first cleaning brush and cleaning of the peel-off surface of the ingot by the second cleaning brush.

Further, the ingot holding unit may be rotatable about an axis perpendicular to the holding surface of the ingot holding unit, while the wafer holding unit may be rotatable about an axis perpendicular to the holding surface of the wafer holding unit. The peel-off surface may be cleaned by the cleaning brush being caused to come into contact with the peel-off surface in a state in which at least one of the ingot holding unit or the wafer holding unit is rotated about the axis.

Further, the cleaning brush may be movable between an operative position where the cleaning brush faces at least one of the peel-off surface of the ingot held by the ingot holding unit or the peel-off surface of the wafer held by the wafer holding unit and an inoperative position where the cleaning brush faces neither the peel-off surface of the ingot held by the ingot holding unit nor the peel-off surface of the wafer held by the wafer holding unit.

Further, the peeling apparatus according to one aspect of the present invention may further include an ultrasonic wave applying unit that applies an ultrasonic wave to the ingot.

The peeling apparatus according to one aspect of the present invention is capable of restraining contamination of an apparatus caused by peeling swarf produced at the time of peeling off a wafer from an ingot.

The above and other objects, features and advantages of the present invention and the manner of realizing them will become more apparent, and the invention itself will best be understood from a study of the following description and appended claims with reference to the attached drawings showing a preferred embodiment of the invention.

DETAILED DESCRIPTION OF THE PREFERRED EMBODIMENT

An embodiment of the present invention will be described below with reference to the attached drawings. It is to be noted that the present invention is not limited by the contents described in the following embodiment. The constituent elements described below include those which can easily be conceived of by those skilled in the art and those that are substantially identical. Moreover, the configurations described below can be combined as appropriate. Further, the configurations can be omitted, replaced, or modified in various ways within the scope not departing from the gist of the present invention.

Embodiment (Ingot)

Figure 1:
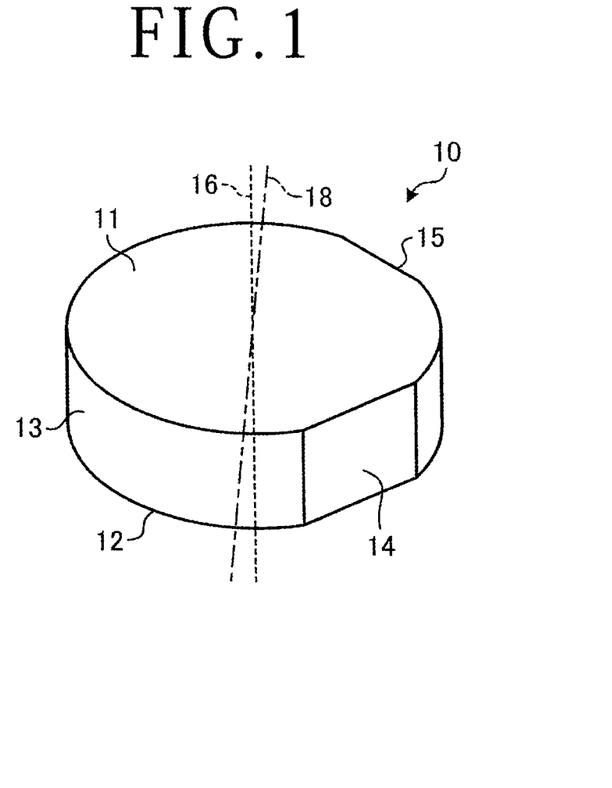
FIG. 1 is a perspective view of an ingot that is to be processed by a peeling apparatus according to an embodiment of the present invention.
Figure 2:
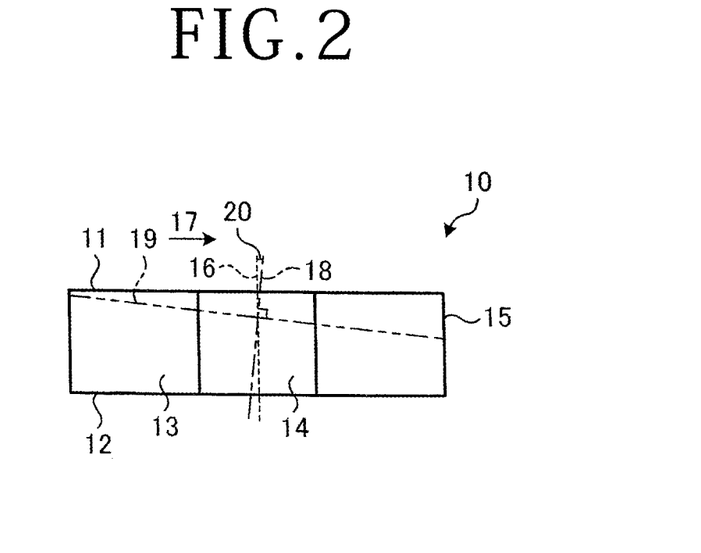
FIG. 2 is a side view of the ingot illustrated in FIG. 1.

First, a configuration of an ingot 10 which is to be processed by a peeling apparatus 100 according to an embodiment of the present invention will be described. FIG. 1 is a perspective view of the ingot 10 which is to be processed by the peeling apparatus 100 according to the embodiment. FIG. 2 is a side view of the ingot 10 illustrated in FIG. 1.

The ingot 10 according to the embodiment which is illustrated in FIGS. 1 and 2 is a semiconductor ingot composed of silicon carbide (SiC) and is formed in a cylindrical shape as a whole. In the embodiment, the ingot 10 is a hexagonal single crystal SiC ingot. The ingot 10 includes a first surface 11, a second surface 12, a circumferential surface 13, a first orientation flat 14, and a second orientation flat 15.

The first surface 11 has a circular shape and forms one end surface of the ingot 10 that is formed in a cylindrical shape. The first surface 11 corresponds to an upper surface of the ingot 10. The second surface 12 has a circular shape and forms an end surface on a side opposite to the first surface 11 of the ingot 10 that is formed in a cylindrical shape. The second surface 12 corresponds to a bottom surface of the ingot 10. The circumferential surface 13 is a surface connected to an outer edge of the first surface 11 and an outer edge of the second surface 12.

The first orientation flat 14 is a flat surface formed on part of the circumferential surface 13 in order to indicate the crystal orientation of the ingot 10. The second orientation flat 15 is a flat surface formed on part of the circumferential surface 13 in order to indicate the crystal orientation of the ingot 10. The second orientation flat 15 is orthogonal to the first orientation flat 14. The first orientation flat 14 is longer than the second orientation flat 15 in the horizontal direction.

The ingot 10 further includes a c-axis 18 and a c-plane 19. The c-axis 18 is inclined by an off angle 20 in an inclination direction 17 toward the second orientation flat 15 with respect to a normal 16 to the first surface 11. The c-plane 19 is orthogonal to the c-axis 18. The inclination direction 17 of the c-axis 18 from the normal 16 is orthogonal to the extension direction of the second orientation flat 15 and parallel to the first orientation flat 14. The c-plane 19 is inclined by the off angle 20 with respect to the first surface 11 of the ingot 10.

The ingot 10 has set therein an infinite number of c-planes 19 on the molecular level of the ingot 10. According to the embodiment, the ingot 10 has the off angle 20 set to 1°, 4°, or 6°, but according to the present invention, the ingot 10 may be manufactured with the off angle 20 being freely set in the range of 1° to 6°, for example. The first surface 11 of the ingot 10 is subjected to polishing processing by a polishing apparatus after being subjected to grinding processing by a grinding apparatus, so that the first surface 11 is formed into a mirror surface.

(Formation of Peel-Off Layer)

Figure 3:
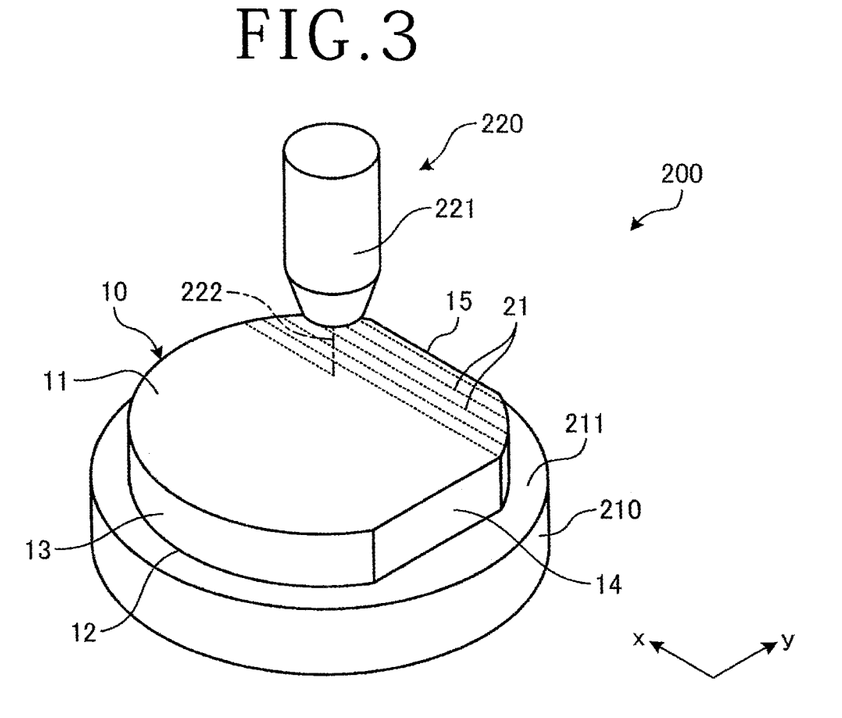
FIG. 3 is a perspective view illustrating a state in which a peel-off layer is being formed inside the ingot illustrated in FIG. 1.
Figure 4:
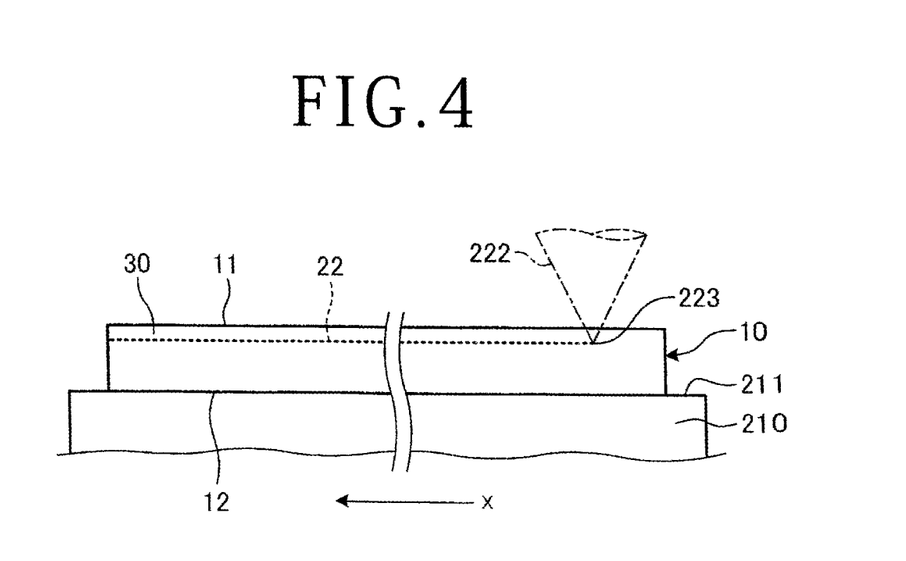
FIG. 4 is a side view of FIG. 3.

Next, a method of forming, inside the ingot 10, a peel-off layer 22 that serves as an interface for peeling, before peeling off a wafer 30 from the ingot 10 by the peeling apparatus 100 according to the embodiment, will be described. FIG. 3 is a perspective view illustrating a state in which the peel-off layer 22 is being formed inside the ingot 10 illustrated in FIG. 1. FIG. 4 is a side view of FIG. 3. It is to be noted that, in the following description, an X-axis direction refers to one direction on a horizontal plane, a Y-axis direction refers to a direction orthogonal to the X-axis direction on the horizontal plane, and a Z-axis direction refers to a direction perpendicular to the X-axis direction and the Y-axis direction. In the embodiment, the X-axis direction is a processing-feed direction, while the Y-axis direction is an indexing-feed direction.

In the embodiment, the peel-off layer 22 is formed by a laser processing apparatus 200. The laser processing apparatus 200 includes a holding unit 210 that has a holding surface 211, a laser beam applying unit 220, and an unillustrated moving unit that moves the holding surface 211 and a condenser 221 of the laser beam applying unit 220 relative to each other.

In forming the peel-off layer 22, first, the second surface 12 side of the ingot 10 is held under suction on the holding surface 211 of the holding unit 210. At this time, the ingot 10 is oriented in a direction parallel to the Y-axis direction where the inclination direction 17 is the indexing-feed direction. Next, the laser beam applying unit 220 and the ingot 10 are aligned to each other.

Specifically, while the unillustrated moving unit moves the holding unit 210 to a predetermined processing position, a height position of the condenser 221 of the laser beam applying unit 220 is adjusted to position a focused spot 223 of a laser beam 222 to a depth corresponding to a thickness of the wafer 30 to be produced, from an end surface (first surface 11) of the ingot 10 (see FIG. 4). The laser beam 222 is a laser beam with a wavelength transmittable through the ingot 10.

In forming the peel-off layer 22, while the focused spot 223 and the ingot 10 are moved relative to each other in the XY direction, a pulsed laser beam 222 is applied toward the ingot 10 to thereby separate the SiC into silicon (S) and carbon (C). Then, a modified portion 21 in which the pulsed laser beam 222 applied next is absorbed by C previously formed and SiC is separated into Si and C in a chain reaction manner is formed inside the ingot 10 along the processing-feed direction, and a crack that extends from the modified portion 21 along the c-plane 19 (see FIG. 2) is generated. In this manner, the peel-off layer 22 including the modified portion 21 and a crack that is formed along the c-plane 19 from the modified portion 21 is formed.

(Peeling Apparatus)

Figure 5:
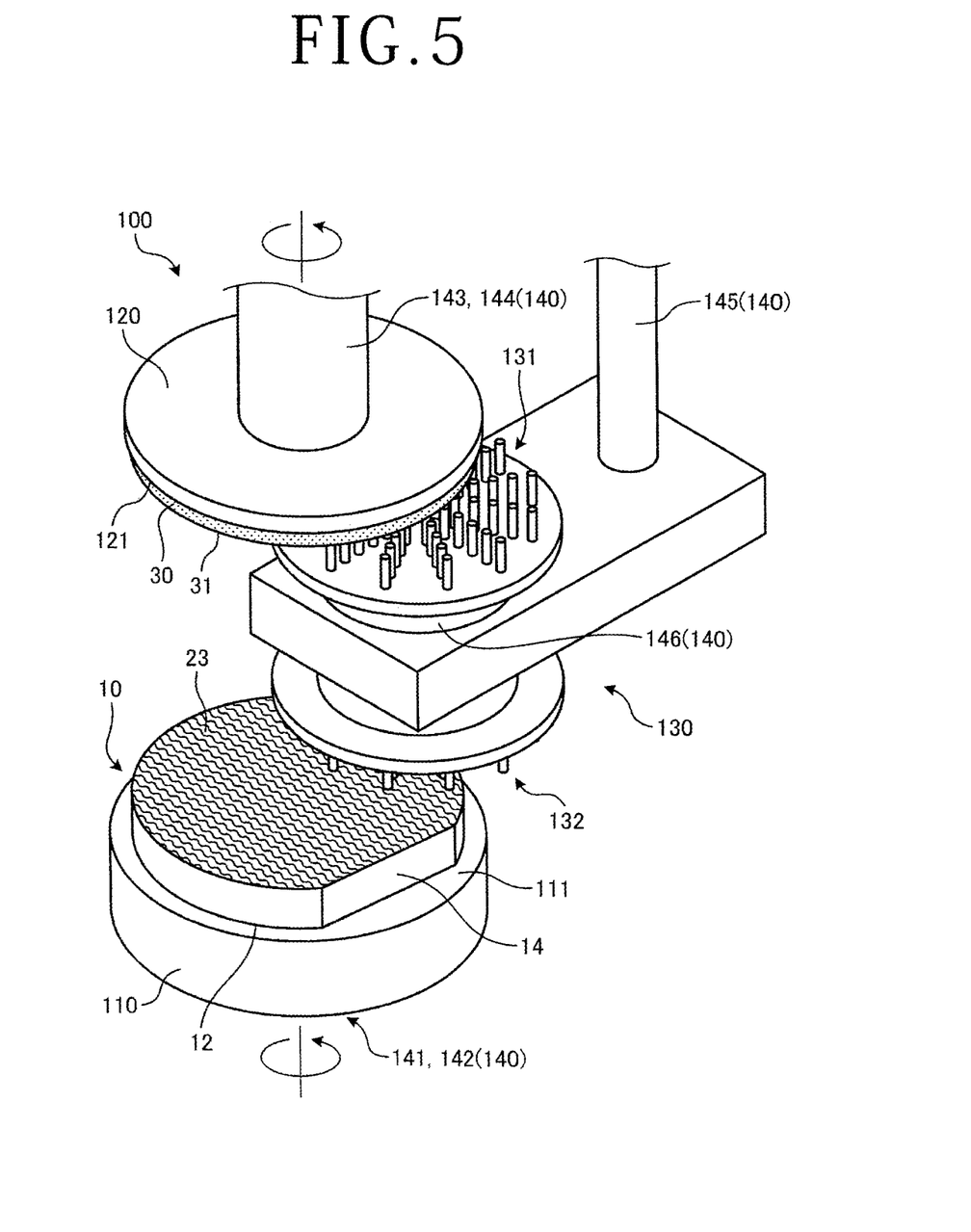
FIG. 5 is a perspective view illustrating a configuration of principal parts of the peeling apparatus according to the embodiment of the present invention.
Figure 6:
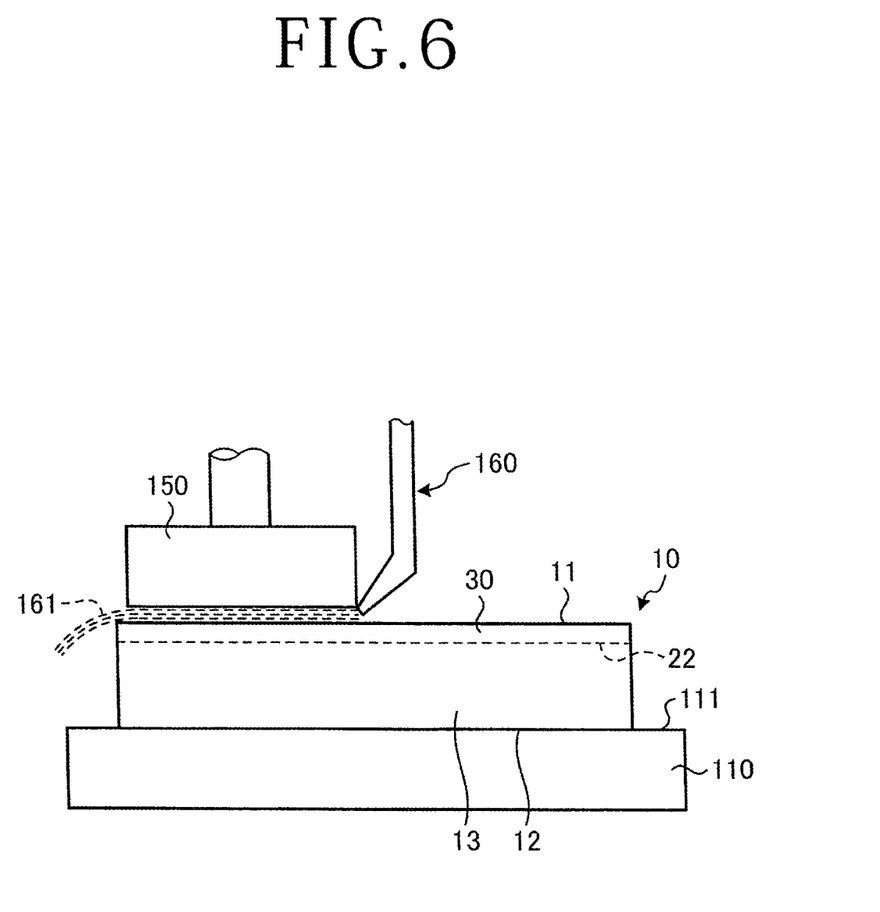
FIG. 6 is a side view for describing a schematic configuration of an ultrasonic wave applying unit of the peeling apparatus illustrated in FIG. 5.
Figure 7:
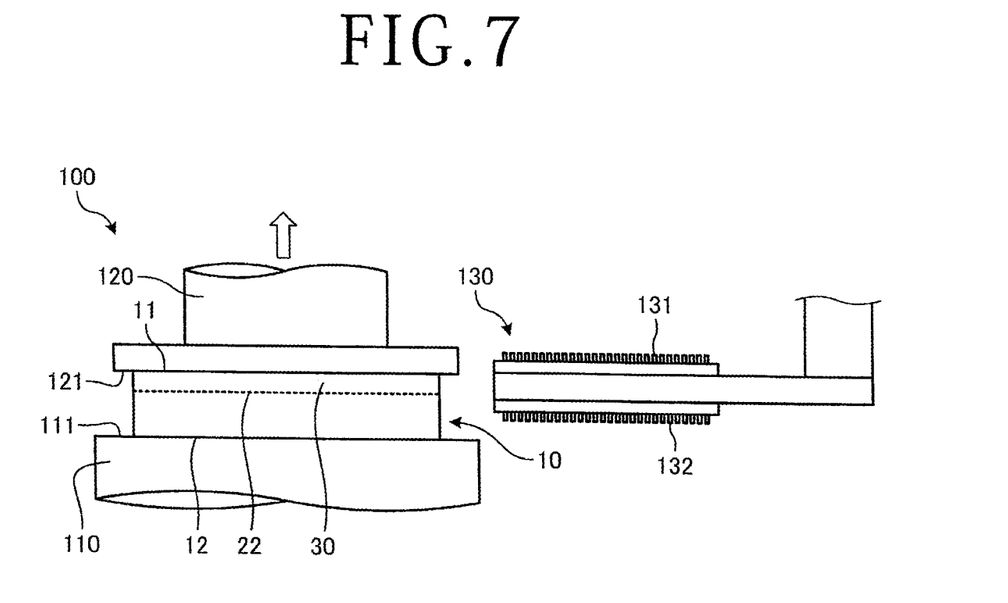
FIG. 7 is a side view illustrating a state prior to peeling off a wafer from an ingot by the peeling apparatus illustrated in FIG. 5.
Figure 8:
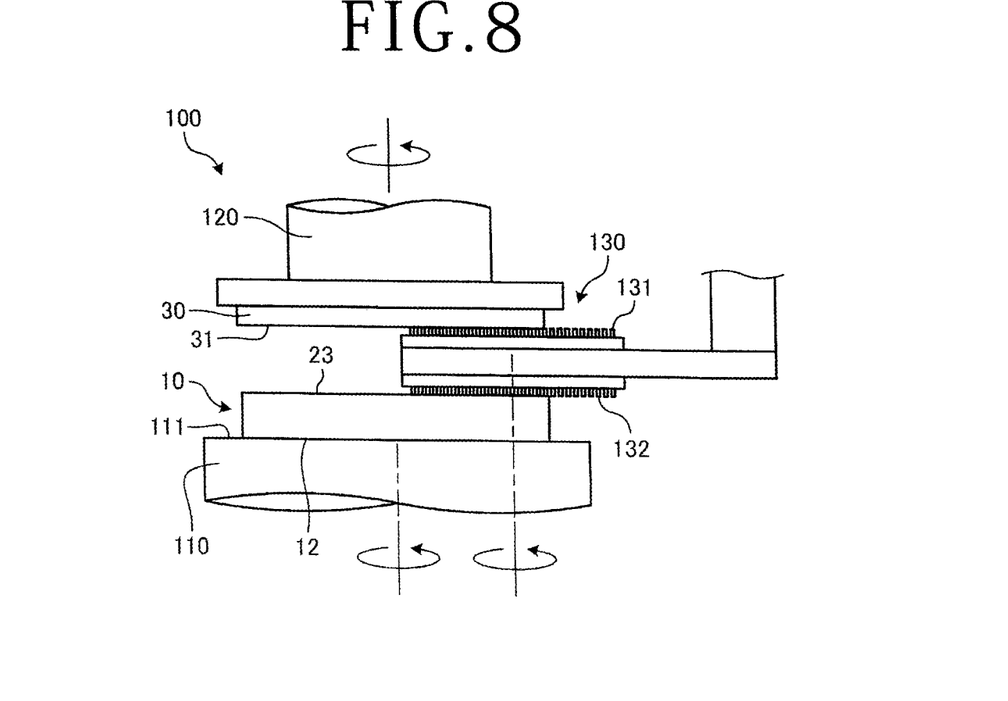
FIG. 8 is a side view illustrating a state in which peel-off surfaces are cleaned by the peeling apparatus illustrated in FIG. 5.

Next, a configuration of the peeling apparatus 100 according to the embodiment of the present invention will be described. FIG. 5 is a perspective view illustrating a configuration of principal parts of the peeling apparatus 100 according to the embodiment. FIG. 6 is a side view for describing a schematic configuration of an ultrasonic wave applying unit 150 of the peeling apparatus 100 illustrated in FIG. 5. FIG. 7 is a side view illustrating a state prior to peeling off a wafer 30 by the peeling apparatus 100 illustrated in FIG. 5. FIG. 8 is a side view illustrating a state in which the peel-off surfaces 23 and 31 are cleaned by the peeling apparatus 100 illustrated in FIG. 5. The peeling apparatus 100 according to the embodiment includes an ingot holding unit 110, a wafer holding unit 120, a cleaning brush 130, a moving unit 140, the ultrasonic wave applying unit 150, and a liquid supply unit 160.

The ingot holding unit 110 holds the ingot 10 on a holding surface 111. The holding surface 111 is a disk-shaped surface formed of porous ceramic or the like. In the embodiment, the holding surface 111 is a flat surface parallel to the horizontal direction. The holding surface 111 is, for example, connected to a vacuum suction source via a vacuum suction channel. The ingot holding unit 110 holds under suction the second surface 12 side of the ingot 10 placed on the holding surface 111.

The ingot holding unit 110 may be provided to be movable in a direction perpendicular to the holding surface 111 (in the embodiment, the vertical direction) by an ingot moving unit 141 of the moving unit 140 to be described later. In the embodiment, the ingot holding unit 110 is rotatable about an axis perpendicular to the holding surface 111 by an ingot rotating unit 142 of the moving unit 140 to be described later. It is to be noted that, in the present description, being "perpendicular" includes a case where a completely perpendicular relation is not established between two components due to errors in size, design, or the like.

The wafer holding unit 120 holds under suction, on a holding surface 121, the wafer 30 to be produced. The holding surface 121 is a disk-shaped surface formed of porous ceramic or the like. In the embodiment, the holding surface 121 is a flat surface that is parallel to the horizontal direction and that faces the holding surface 111 of the ingot holding unit 110. The holding surface 121 is, for example, connected to a vacuum suction source via a vacuum suction channel. The wafer holding unit 120 holds under suction the first surface 11 side of the ingot 10 that is in contact with the holding surface 121.

The wafer holding unit 120 is capable of approaching and separating from the ingot holding unit 110. In the embodiment, the wafer holding unit 120 is capable of moving in a direction perpendicular to the holding surface 121 (in the embodiment, the vertical direction) by a wafer moving unit 143 of the moving unit 140 to be described later. In the embodiment, the wafer holding unit 120 is rotatable about an axis perpendicular to the holding surface 121 by a wafer rotating unit 144 of the moving unit 140 to be described later.

The cleaning brush 130 cleans the peel-off surfaces 23 and 31 at which the wafer 30 to be produced has been peeled off from the ingot 10 and thereby removes peeling swarf. The cleaning brush 130 includes a disk-shaped base section and bristle members extending in a vertical direction from the base section. As illustrated in FIG. 5, the bristle members are disposed radially from a central portion of the disk-shaped base section toward an outer circumferential portion in plan view.

In the embodiment, the cleaning brush 130 includes a first cleaning brush 131 and a second cleaning brush 132. The first cleaning brush 131 faces the holding surface 121 of the wafer holding unit 120 and cleans the peel-off surface 31 of the wafer 30 that has been peeled off from the ingot 10. The second cleaning brush 132 faces the holding surface 111 of the ingot holding unit 110 and cleans the peel-off surface 23 of the ingot 10 from which the wafer 30 has been peeled off.

The first cleaning brush 131 of the cleaning brush 130 comes into contact with the peel-off surface 31 of the wafer 30 that has been peeled off from the ingot 10 and thereby cleans the peel-off surface 31, in a state in which the wafer holding unit 120 is rotated about the axis. The second cleaning brush 132 of the cleaning brush 130 comes into contact with the peel-off surface 23 of the ingot 10 from which the wafer 30 has been peeled off and thereby cleans the peel-off surface 23, in a state in which the ingot holding unit 110 is rotated about the axis.

The cleaning brush 130 is movable between the inoperative position illustrated in FIG. 7 and the operative position illustrated in FIG. 8. The operative position is a position where the cleaning brush 130 faces at least one of the peel-off surface 23 of the ingot 10 held by the ingot holding unit 110 or the peel-off surface 31 of the wafer 30 held by the wafer holding unit 120. The inoperative position is a position where the cleaning brush 130 faces neither the peel-off surface 23 of the ingot 10 held by the ingot holding unit 110 nor the peel-off surface 31 of the wafer 30 held by the wafer holding unit 120.

The cleaning brush 130 is capable of simultaneously performing cleaning of the peel-off surface 31 of the wafer 30 by the first cleaning brush 131 and cleaning of the peel-off surface 23 of the ingot 10 by the second cleaning brush 132. More specifically, in the operative position, the cleaning brush 130 is capable of simultaneously cleaning the peel-off surface 31 of the wafer 30 and the peel-off surface 23 of the ingot 10, by the wafer holding unit 120 approaching the ingot holding unit 110 in such a manner that the first cleaning brush 131 comes into contact with the peel-off surface 31 of the wafer 30 and the second cleaning brush 132 comes into contact with the peel-off surface 23 of the ingot 10, in a state in which the ingot holding unit 110 and the wafer holding unit 120 are rotated about the axis.

In the embodiment, the cleaning brush 130 is movable in the parallel direction and the vertical direction with respect to the holding surface 121 of the wafer holding unit 120 and the holding surface 111 of the ingot holding unit 110 by a brush moving unit 145 of the moving unit 140 to be described later. In the embodiment, the cleaning brush 130 is rotatable about the axis perpendicular to the holding surface 121 of the wafer holding unit 120 and the holding surface 111 of the ingot holding unit 110, by a brush rotating unit 146 of the moving unit 140 to be described later. The cleaning brush 130 comes into contact with the peel-off surface 31 of the wafer 30 held by the wafer holding unit 120 and thereby cleans the peel-off surface 31, in a state in which the cleaning brush 130 is rotated about the axis. The cleaning brush 130 comes into contact with the peel-off surface 23 of the ingot 10 held by the ingot holding unit 110 and thereby cleans the peel-off surface 23, in a state in which the cleaning brush 130 is rotated about the axis. The peeling apparatus 100 according to the embodiment is capable of mutually rotating the cleaning brush 130 and at least either the ingot holding unit 110 or the wafer holding unit 120 about the axis.

The moving unit 140 makes the cleaning brush 130 and at least either the peel-off surface 23 of the ingot 10 held by the ingot holding unit 110 or the peel-off surface 31 of the wafer 30 held by the wafer holding unit 120 come into contact with each other and moves them relative to each other. In the embodiment, the moving unit 140 includes the ingot moving unit 141, the ingot rotating unit 142, the wafer moving unit 143, the wafer rotating unit 144, the brush moving unit 145, and the brush rotating unit 146.

The ingot moving unit 141 includes, for example, a ball screw-type lifting and lowering mechanism including a ball screw coupled to a motor. The ingot moving unit 141 moves the holding surface 111 of the ingot holding unit 110 in a direction perpendicular to the holding surface 111 (in the embodiment, vertical direction). The ingot moving unit 141 enables the ingot 10 held on the holding surface 111 of the ingot holding unit 110 to approach and separate from, in the vertical direction, the wafer 30 held by the wafer holding unit 120. The ingot moving unit 141 may move the holding surface 111 of the ingot holding unit 110 in a direction parallel to the holding surface 111. In addition, the ingot moving unit 141 may have, for example, an actuator (air actuator or oil actuator) that is driven by air, oil, or the like, in place of or in addition to the ball screw-type lifting and lowering mechanism.

The ingot rotating unit 142 includes, for example, a rotation drive mechanism, such as a motor, coupled to the ingot holding unit 110. The ingot rotating unit 142 rotates the holding surface 111 of the ingot holding unit 110 about the axis perpendicular to the holding surface 111. The ingot rotating unit 142 enables the ingot 10 held on the holding surface 111 of the ingot holding unit 110 to rotate about the axis of the ingot holding unit 110 with respect to the cleaning brush 130.

The wafer moving unit 143 includes, for example, a ball screw-type lifting and lowering mechanism including a ball screw coupled to a motor. The wafer moving unit 143 moves the holding surface 121 of the wafer holding unit 120 in a direction perpendicular to the holding surface 121 (in the embodiment, vertical direction). The wafer moving unit 143 enables the wafer 30 held on the holding surface 121 of the wafer holding unit 120 to approach or separate from, in the vertical direction, the ingot 10 held by the ingot holding unit 110. The wafer moving unit 143 may move the holding surface 121 of the wafer holding unit 120 in a direction parallel to the holding surface 121. In addition, the wafer moving unit 143 may have, for example, an actuator (air actuator or oil actuator) that is driven by air, oil, or the like, in place of or in addition to the ball screw-type lifting and lowering mechanism. It is to be noted that either the ingot moving unit 141 or the wafer moving unit 143 may be omitted.

The wafer rotating unit 144 includes, for example, a rotation drive mechanism, such as a motor, coupled to the wafer holding unit 120. The wafer rotating unit 144 rotates the holding surface 121 of the wafer holding unit 120 about the axis perpendicular to the holding surface 121. The wafer rotating unit 144 enables the wafer 30 held on the holding surface 121 of the wafer holding unit 120 to rotate about the axis of the wafer holding unit 120 with respect to the cleaning brush 130.

The brush moving unit 145 includes, for example, a ball screw-type moving mechanism including a ball screw coupled to a motor. The brush moving unit 145 moves the cleaning brush 130 in directions parallel to and perpendicular to the holding surface 111 of the ingot holding unit 110 and the holding surface 121 of the wafer holding unit 120. The brush moving unit 145 enables the cleaning brush 130 to move between the inoperative position illustrated in FIG. 7 and the operative position illustrated in FIG. 8. Moreover, the brush moving unit 145 enables the first cleaning brush 131 of the cleaning brush 130 to move in such a manner as to come into contact with the peel-off surface 31 of the wafer 30 held on the holding surface 121 of the wafer holding unit 120. The brush moving unit 145 also enables the second cleaning brush 132 of the cleaning brush 130 to move in such a manner as to come into contact with the peel-off surface 23 of the ingot 10 held on the holding surface 111 of the ingot holding unit 110. It is to be noted that the brush moving unit 145 may have, for example, an actuator (air actuator or oil actuator) that is driven by air, oil, or the like, in place of or in addition to the ball screw-type moving mechanism.

The brush rotating unit 146 includes, for example, a rotation drive mechanism, such as a motor, coupled to the cleaning brush 130. The brush rotating unit 146 rotates the cleaning brush 130 about the axis perpendicular to the holding surface 121 of the wafer holding unit 120 and the holding surface 111 of the ingot holding unit 110. The brush rotating unit 146 enables the cleaning brush 130 to rotate about the axis with respect to the peel-off surface 31 of the wafer 30 held on the holding surface 121 of the wafer holding unit 120 and the peel-off surface 23 of the ingot 10 held on the holding surface 111 of the ingot holding unit 110.

The ultrasonic wave applying unit 150 illustrated in FIG. 6 is a unit used to apply an ultrasonic wave to the ingot 10, peel off part of the first surface 11 side of the ingot 10 with the peel-off layer 22 formed inside the ingot 10 serving as an interface, and produce the peeled-off part as the wafer 30. The ultrasonic wave applying unit 150 according to the embodiment applies an ultrasonic wave to the ingot 10 held on the holding surface 111 of the ingot holding unit 110. The ultrasonic wave applying unit 150 includes, for example, an ultrasonic power supply and an ultrasonic transducer which is formed of piezoelectric ceramics or the like and to which voltage is applied from the ultrasonic power supply.

The liquid supply unit 160 is a unit used to supply liquid 161 to a portion between the ultrasonic transducer and the ingot 10 when the ultrasonic wave applying unit 150 applies an ultrasonic wave to the ingot 10 held on the holding surface 111 of the ingot holding unit 110.

At the time of peeling off a wafer 30 at the peel-off layer 22 of the ingot 10 by the ultrasonic wave applying unit 150, first, the second surface 12 side of the ingot 10 is held under suction on the holding surface 111 of the ingot holding unit 110. Next, the ultrasonic transducer of the ultrasonic wave applying unit 150 is made to face the first surface 11 of the ingot 10. Then, the liquid supply unit 160 supplies liquid 161 to a portion between the ultrasonic transducer and the ingot 10.

In this state, voltage is applied from the ultrasonic power supply of the ultrasonic wave applying unit 150 to generate ultrasonic vibration in the ultrasonic transducer, whereby an ultrasonic vibration of a frequency corresponding to the vibration of the ultrasonic transducer is propagated in the liquid 161 and thereby applied to the ingot 10. Applying an ultrasonic vibration to the entire surface of the ingot 10 leads to part of the first surface 11 side of the ingot 10 being peeled off with the peel-off layer 22 formed by application of the laser beam 222 serving as an interface.

As illustrated in FIGS. 7 and 8, the peeling apparatus 100 peels off the wafer 30 from the ingot 10 and separates the two with the peel-off layer 22 serving as an interface, when the wafer holding unit 120 separates from the ingot holding unit 110, in a state in which the ingot holding unit 110 is holding the second surface 12 of the ingot 10 and the wafer holding unit 120 is holding under suction the first surface 11 of the ingot 10. Specifically, the peeling apparatus 100 peels off, as the wafer 30, a portion between the first surface 11 of the ingot 10 and the peel-off layer 22 from a portion between the second surface 12 of the ingot 10 and the peel-off layer 22.

As illustrated in FIG. 8, after peeling off the wafer 30 from the ingot 10, the peeling apparatus 100 uses the cleaning brush 130 to clean the peel-off surface 23 of the ingot 10 held by the ingot holding unit 110 and the peel-off surface 31 of the wafer 30 held under suction by the wafer holding unit 120 and thereby remove peeling swarf. The cleaning brush 130 according to the embodiment is capable of simultaneously cleaning the peel-off surface 23 of the ingot 10 and the peel-off surface 31 of the wafer 30.

As described above, the peeling apparatus 100 according to the embodiment causes the cleaning brush 130 to come into contact with either the peel-off surface 23 of the ingot 10 or the peel-off surface 31 of the wafer 30 and thereby cleans the peel-off surface 23 or 31. These steps of cleaning are performed after the wafer 30 has been peeled off from the ingot 10 but before the produced wafer 30 is transferred.

Specifically, the ingot 10 from which the wafer 30 has been peeled off has the peel-off surface 23 cleaned, in a state in which the ingot 10 is still being held by the ingot holding unit 110 by which the ingot 10 is held at the time when the wafer 30 is being peeled off therefrom. The wafer 30 peeled off from the ingot 10 has the peel-off surface 31 cleaned in a state in which the wafer 30 is still being positioned above the ingot 10 and held by the wafer holding unit 120 by which the wafer 30 is held under suction at the time of being peeled off from the ingot 10.

This leads to the peeling swarf produced from the peel-off surfaces 23 and 31 at the time of peeling off the wafer 30 from the ingot 10 being removed before the wafer 30 is transferred from the peeling apparatus 100, making it possible to restrain apparatus contamination caused by the peeling swarf.

It is to be noted that the present invention is not limited to the abovementioned embodiment. Specifically, the present invention can be implemented by being modified in various ways within the scope not departing from the gist of the present invention.

For example, according to the present invention, the configuration of the laser processing apparatus 200 may be included in the peeling apparatus 100, and the ingot holding unit 110 may be identical to the holding unit 210 of the laser processing apparatus 200.

According to the embodiment, the ingot holding unit 110 and the wafer holding unit 120 are also rotatable about an axis, but according to the present invention, the cleaning brush 130 may be rotated alone.

Moreover, according to the embodiment, the cleaning brush 130 includes the first cleaning brush 131 and the second cleaning brush 132 and is capable of simultaneously cleaning the peel-off surface 23 of the ingot 10 and the peel-off surface 31 of the wafer 30 by the brushes on both sides, but according to the present invention, the cleaning brush 130 may include a brush only on one side and clean one surface at a time by inverting the brush.

Further, the cleaning brush 130 according to the embodiment has a circular shape in plan view as illustrated in FIG. 5 and cleans the peel-off surfaces 23 and 31 by being rotated about the axis, but according to the present invention, as described in the following modification, the cleaning brush 130 may have a shape other than a circle.

Modification

Figure 9:
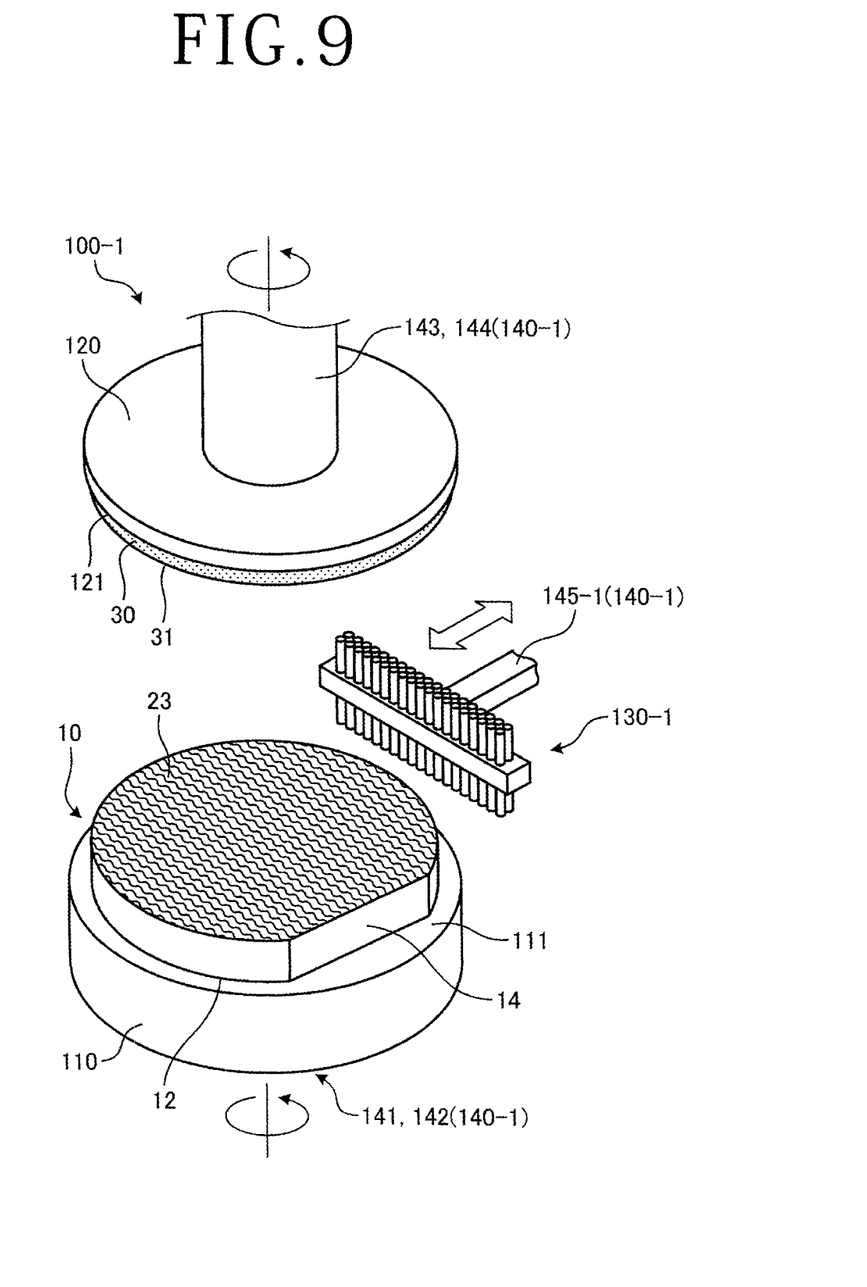
FIG. 9 is a perspective view illustrating a configuration of principal parts of the peeling apparatus according to a modification.

FIG. 9 is a perspective view illustrating a configuration of principal parts of a peeling apparatus 100-1 according to a modification. Compared with the peeling apparatus 100 according to the embodiment, the peeling apparatus 100-1 according to the modification has such a difference that it includes a cleaning brush 130-1 and a moving unit 140-1 in place of the cleaning brush 130 and the moving unit 140.

The cleaning brush 130-1 includes a rod-shaped base section extending in one direction parallel to the holding surface 111 of the ingot holding unit 110 and bristle members extending in a vertical direction from the base section. As illustrated in FIG. 9, the bristle members are disposed in rows along a longitudinal direction of the rod-shaped base section.

Compared with the moving unit 140 according to the embodiment, the moving unit 140-1 according to the modification has such a difference that it includes a brush moving unit 145-1 in place of the brush moving unit 145 and the brush rotating unit 146.

The brush moving unit 145-1 moves the cleaning brush 130-1 in a direction parallel to the holding surface 111 of the ingot holding unit 110 and the holding surface 121 of the wafer holding unit 120 and a direction perpendicular to the longitudinal direction of the rod-shaped base section of the cleaning brush 130-1. Moreover, the brush moving unit 145-1 moves the cleaning brush 130-1 in a direction perpendicular to the holding surface 111 of the ingot holding unit 110 and the holding surface 121 of the wafer holding unit 120.

The cleaning brush 130-1 reciprocally moves in the direction parallel to the holding surface 111 of the ingot holding unit 110 and the direction perpendicular to the longitudinal direction of the rod-shaped base section of the cleaning brush 130-1 to clean the peel-off surface 23 of the ingot 10 from which the wafer 30 has been peeled off, in a state in which the cleaning brush 130-1 is in contact with the peel-off surface 23. At this time, the ingot holding unit 110 may be rotated about the axis. This leads to uniform cleaning of the peel-off surface 23 in whole.

The cleaning brush 130-1 reciprocally moves in the direction parallel to the holding surface 121 of the wafer holding unit 120 and the direction perpendicular to the longitudinal direction of the rod-shaped base section of the cleaning brush 130-1 to clean the peel-off surface 31 of the wafer 30 peeled off from the ingot 10, in a state in which the cleaning brush 130-1 is in contact with the peel-off surface 31. At this time, the wafer holding unit 120 may be rotated about the axis. This leads to uniform cleaning of the peel-off surface 31 in whole.

The cleaning brush 130-1 may simultaneously perform cleaning of the peel-off surface 23 of the ingot 10 and cleaning of the peel-off surface 31 of the wafer 30. More specifically, simultaneous cleaning of the peel-off surface 31 of the wafer 30 and the peel-off surface 23 of the ingot 10 can be achieved by having the wafer holding unit 120 approach the ingot holding unit 110 in such a manner that the cleaning brush 130-1 comes into contact with both the peel-off surface 23 of the ingot 10 and the peel-off surface 31 of the wafer 30.

As described above, the peeling apparatus 100-1 uses the cleaning brush 130-1 to clean the peel-off surface 23 of the ingot 10 held by the ingot holding unit 110 and the peel-off surface 31 of the wafer 30 held under suction by the wafer holding unit 120 and thereby remove peeling swarf, after peeling off the wafer 30 from the ingot 10, as in the embodiment.

The present invention is not limited to the details of the above described preferred embodiment. The scope of the invention is defined by the appended claims and all changes and modifications as fall within the equivalence of the scope of the claims are therefore to be embraced by the invention.

What is claimed is:

1. A peeling apparatus for peeling off, from an ingot in which a peel-off layer is formed, a wafer to be produced, by positioning a focused spot of a laser beam with a wavelength transmittable through the ingot to a depth corresponding to a thickness of the wafer to be produced, from an end surface of the ingot, and applying the laser beam to the ingot, the peeling apparatus comprising:

an ingot holding unit that has a holding surface for holding the ingot;

a wafer holding unit that is capable of approaching and separating from the ingot holding unit and has a holding surface for holding under suction the wafer to be produced;

a cleaning brush that cleans peel-off surfaces at which the wafer to be produced has been peeled off from the ingot and thereby removes peeling swarf; and a brush rotating unit including a motor that is coupled to the cleaning brush; and wherein the brush rotating unit is configured and arranged such that the motor rotates the cleaning brush about an axis perpendicular to the holding surface of the wafer holding unit and the holding surface of the ingot holding unit, and wherein at least one of a peel-off surface of the wafer held by the wafer holding unit or a peel-off surface of the ingot held by the ingot holding unit is cleaned by the cleaning brush being caused to come into contact with the one of the peel-off surfaces in a state in which the cleaning brush is rotated about the axis, wherein the cleaning brush includes:
- a first cleaning brush that faces the holding surface of the wafer holding unit and cleans a peel-off surface of the wafer that has been peeled off from the ingot, and
- a second cleaning brush that faces the holding surface of the ingot holding unit and cleans a peel-off surface of the ingot from which the wafer has been peeled off, and further wherein the cleaning brush is capable of simultaneously performing cleaning of the peel-off surface of the wafer by the first cleaning brush and cleaning of the peel-off surface of the ingot by the second cleaning brush.

2. The peeling apparatus according to claim 1, wherein:
the ingot holding unit is rotatable about an axis perpendicular to the holding surface of the ingot holding unit,
the wafer holding unit is rotatable about an axis perpendicular to the holding surface of the wafer holding unit, and
one of the peel-off surfaces is cleaned by the cleaning brush being caused to come into contact with the one peel-off surface in a state in which at least one of the ingot holding unit or the wafer holding unit is rotated about the axis.

3. The peeling apparatus according to claim 1, wherein the cleaning brush is movable between:
an operative position where the cleaning brush faces at least one of a peel-off surface of the ingot held by the ingot holding unit or a peel-off surface of the wafer held by the wafer holding unit, and
an inoperative position where the cleaning brush faces neither the peel-off surface of the ingot held by the ingot holding unit nor the peel-off surface of the wafer held by the wafer holding unit.

4. The peeling apparatus according to claim 1, further comprising:
an ultrasonic wave applying unit that applies an ultrasonic wave to the ingot.

5. The peeling apparatus according to claim 1, further comprising:
an ingot rotating unit, including an ingot rotating motor, that is configured and arranged to rotate the ingot holding about an axis perpendicular to the holding surface of the ingot holding unit; and
a wafer rotating unit, including a wafer rotating motor, that is configured and arranged to rotate the wafer holding unit about an axis perpendicular to the holding surface of the wafer holding unit, and wherein one of the peel-off surfaces is cleaned by the cleaning brush being caused to come into contact with the one peel-off surface in a state in which at least one of the ingot holding unit or the wafer holding unit is rotated about the axis.

6. A peeling apparatus for peeling off, from an ingot in which a peel-off layer is formed, a wafer to be produced, by positioning a focused spot of a laser beam with a wavelength transmittable through the ingot to a depth corresponding to a thickness of the wafer to be produced, from an end surface of the ingot, and applying the laser beam to the ingot, the peeling apparatus comprising:

an ingot holding unit that has a holding surface for holding the ingot;

a wafer holding unit that is capable of approaching and separating from the ingot holding unit and has a holding surface for holding under suction the wafer to be produced;

a cleaning brush that cleans peel-off surfaces at which the wafer to be produced has been peeled off from the ingot and thereby removes peeling swarf; and a brush rotating unit including a motor that is coupled to the cleaning brush; and wherein the brush rotating unit is configured and arranged such that the motor rotates the cleaning brush about an axis perpendicular to the holding surface of the wafer holding unit and the holding surface of the ingot holding unit, and wherein at least one of a peel-off surface of the wafer held by the wafer holding unit or a peel-off surface of the ingot held by the ingot holding unit is cleaned by the cleaning brush being caused to come into contact with the one of the peel-off surfaces in a state in which the cleaning brush is rotated about the axis, and wherein the cleaning brush includes:
- a first cleaning brush that faces the holding surface of the wafer holding unit and cleans a peel-off surface of the wafer that has been peeled off from the ingot, and
- a second cleaning brush that faces the holding surface of the ingot holding unit and cleans a peel-off surface of the ingot from which the wafer has been peeled off, and wherein the cleaning brush is capable of simultaneously performing cleaning of the peel-off surface of the wafer by the first cleaning brush and cleaning of the peel-off surface of the ingot by the second cleaning brush, and wherein the peeling apparatus further comprises:
an ingot rotating unit, including an ingot rotating motor, that is configured and arranged to rotate the ingot holding about an axis perpendicular to the holding surface of the ingot holding unit; and
a wafer rotating unit, including a wafer rotating motor, that is configured and arranged to rotate the wafer holding unit about an axis perpendicular to the holding surface of the wafer holding unit.

* * * * *